United States Patent
Laaksonen

(10) Patent No.: US 10,140,169 B2
(45) Date of Patent: Nov. 27, 2018

(54) FAULT TRACKING IN A TELECOMMUNICATIONS SYSTEM

(71) Applicant: NOKIA SOLUTIONS AND NETWORKS OY, Espoo (FI)

(72) Inventor: Heikki Jarmo Tapani Laaksonen, Helsinki (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 14/892,425

(22) PCT Filed: May 22, 2013

(86) PCT No.: PCT/EP2013/060467
§ 371 (c)(1),
(2) Date: Nov. 19, 2015

(87) PCT Pub. No.: WO2014/187478
PCT Pub. Date: Nov. 27, 2014

(65) Prior Publication Data
US 2016/0092294 A1    Mar. 31, 2016

(51) Int. Cl.
G06F 11/00    (2006.01)
G06F 11/07    (2006.01)
H04W 24/04    (2009.01)
H04L 12/24    (2006.01)

(52) U.S. Cl.
CPC ...... *G06F 11/0778* (2013.01); *G06F 11/0709* (2013.01); *G06F 11/0751* (2013.01); *G06F 11/0772* (2013.01); *H04L 41/069* (2013.01); *H04W 24/04* (2013.01)

(58) Field of Classification Search
CPC ............ G06F 11/0778; G06F 11/0751; G06F 11/0772; G06F 11/0709; H04L 41/069; H04W 24/04
USPC ........................................ 714/4.11
See application file for complete search history.

(56) References Cited

U.S. PATENT DOCUMENTS

| | | | |
|---|---|---|---|
| 5,610,915 A * | 3/1997 | Elliott .................... | H04L 41/22 370/259 |
| 5,623,532 A * | 4/1997 | Houde .................. | H04W 24/02 455/445 |
| 6,070,213 A * | 5/2000 | Giordano ................ | H04Q 1/10 370/431 |

(Continued)

FOREIGN PATENT DOCUMENTS

| | | |
|---|---|---|
| EP | 2 706 810 A2 | 3/2014 |
| WO | WO 2011/157166 A2 | 12/2011 |

OTHER PUBLICATIONS

Wikipedia definition for "non-volatile memory", retrieved from https://en.wikipedia.org/wiki/Non-volatile_memory (Year: 2018).*

(Continued)

*Primary Examiner* — Yair Leibovich
(74) *Attorney, Agent, or Firm* — Squire Patton Boggs (US) LLP

(57) ABSTRACT

A method and apparatus can be configured to automatically trigger a notifying event when a failure occurs. The method can also store information specifically relating to the failure. The storing is performed upon the automatic triggering of the notifying event. The specific information is stored such that the specific information persists after a system restart.

17 Claims, 3 Drawing Sheets

(56) References Cited

U.S. PATENT DOCUMENTS

| | | | |
|---|---|---|---|
| 6,515,968 B1* | 2/2003 | Combar | G06F 11/0709 370/252 |
| 8,854,988 B2* | 10/2014 | Turk | H04L 63/1416 370/248 |
| 2005/0073998 A1* | 4/2005 | Zhu | H04L 29/06027 370/352 |
| 2005/0083844 A1* | 4/2005 | Zhu | H04L 29/06027 370/230.1 |
| 2007/0277155 A1* | 11/2007 | Casey | G06F 11/3466 717/124 |
| 2011/0235505 A1 | 9/2011 | Eswara et al. | |
| 2012/0155247 A1* | 6/2012 | Li | H04L 45/00 370/220 |
| 2012/0190325 A1* | 7/2012 | Abu-Hakima | H04W 4/90 455/404.2 |
| 2013/0083650 A1* | 4/2013 | Taleb | H04W 8/30 370/218 |
| 2016/0092294 A1* | 3/2016 | Laaksonen | H04L 41/069 714/45 |

OTHER PUBLICATIONS

International Search Report and Written Opinion dated Apr. 2, 2014 corresponding to International Patent Application No. PCT/EP2013/060467.

* cited by examiner

FAULT TRACKING IN A TELECOMMUNICATIONS SYSTEM

BACKGROUND

Field

Embodiments of the invention relate to tracking faults within a network.

Description of the Related Art

Long-term Evolution (LTE) is a standard for wireless communication that seeks to provide improved speed and capacity for wireless communications by using new modulation/signal processing techniques. The standard was proposed by the 3$^{rd}$ Generation Partnership Project (3GPP), and is based upon previous network technologies. Since its inception, LTE has seen extensive deployment in a wide variety of contexts involving the communication of data.

SUMMARY

According to a first embodiment, a method can comprise automatically triggering, by a signaling/data unit, a notifying event when a failure occurs. The method can also include storing information specifically relating to the failure. The storing can be performed upon the automatic triggering of the notifying event. The specific information can be stored such that the specific information persists after a system restart.

In the method of the first embodiment, the failure can comprise a failure within an advanced telecommunications computing architecture system or a cloud-based mobile network system.

In the method of the first embodiment, the failure can comprise a failure within a mobility management entity.

In the method of the first embodiment, automatically triggering the notifying event when the failure occurs can comprise triggering the notifying event using at least one of a cause code, a setting off of an alarm, and a configuring of a critical log.

In the method of the first embodiment, the storing information specifically relating to the failure can comprise coordinating a mobility-management/session-management process to perform storing of the specific information relating to the failure, and the specific information relating to the failure comprises at least one of process information, communication information, alarm information, and log information.

In the method of the first embodiment, the specific information can be associated with a specific subscriber that experienced the failure.

According to a second embodiment, an apparatus can comprise at least one processor. The apparatus can also comprise at least one memory including computer program code. The at least one memory and the computer program code can be configured, with the at least one processor, to cause the apparatus at least to automatically trigger a notifying event when a failure occurs. The apparatus can also store information specifically relating to the failure. The storing is performed upon the automatic triggering of the notifying event. The specific information can be stored such that the specific information persists after a system restart.

In the apparatus of the second embodiment, the failure can comprise a failure within an advanced telecommunications computing architecture system or a cloud-based mobile network system.

In the apparatus of the second embodiment, the failure can comprise a failure within a mobility management entity.

In the apparatus of the second embodiment, automatically triggering the notifying event when the failure occurs can comprise triggering the notifying event using at least one of a cause code, a setting off of an alarm, and a configuring of a critical log.

In the apparatus of the second embodiment, the storing information specifically relating to the failure can comprise coordinating a mobility-management/session-management process to perform storing of the specific information relating to the failure. The specific information relating to the failure can comprise at least one of process information, communication information, alarm information, and log information.

In the apparatus of the second embodiment, the specific information can be associated with a specific subscriber that experienced the failure.

According to a third embodiment, a computer program product can be embodied on a non-transitory computer readable medium. The computer program product can be configured to control a processor to perform a process comprising automatically triggering a notifying event when a failure occurs. The process can also include storing information specifically relating to the failure. The storing is performed upon the automatic triggering of the notifying event. The specific information is stored such that the specific information persists after a system restart.

According to a fourth embodiment, a method can comprise receiving, by an operation and maintenance unit, information specifically relating to a failure. The receiving can be performed upon an automatic triggering of a notifying event. The automatic triggering of the notifying event can occur when the failure occurs. The method can also include storing the specific information such that the specific information persists after a system restart.

In the method of the fourth embodiment, the failure can comprise a failure within an advanced telecommunications computing architecture system or a cloud-based mobile network system.

In the method of the fourth embodiment, the failure can comprise a failure within a mobility management entity.

In the method of the fourth embodiment, the specific information can be associated with a specific subscriber that experienced the failure.

In the method of the fourth embodiment, the method can further comprise transmitting the specific information to an external tool.

According to a fifth embodiment, an apparatus can comprise at least one processor. The apparatus can also include at least one memory including computer program code. The at least one memory and the computer program code can be configured, with the at least one processor, to cause the apparatus at least to receive information specifically relating to a failure. The receiving can be performed upon an automatic triggering of a notifying event. The automatic triggering of the notifying event occurs when the failure occurs. The apparatus can also store the specific information such that the specific information persists after a system restart.

In the apparatus of the fifth embodiment, the failure can comprise a failure within an advanced telecommunications computing architecture system or a cloud-based mobile network system.

In the apparatus of the fifth embodiment, the failure can comprise a failure within a mobility management entity.

In the apparatus of the fifth embodiment, the specific information can be associated with a specific subscriber that experienced the failure.

In the apparatus of the fifth embodiment, the apparatus can be further caused to transmit the specific information to an external tool.

According to a sixth embodiment, a computer program product can be embodied on a non-transitory computer readable medium. The computer program product can be configured to control a processor to perform a process comprising receiving information specifically relating to a failure. The receiving is performed upon an automatic triggering of a notifying event. The automatic triggering of the notifying event occurs when the failure occurs. The process can include storing the specific information such that the specific information persists after a system restart.

BRIEF DESCRIPTION OF THE DRAWINGS

For proper understanding of the invention, reference should be made to the accompanying drawings, wherein.

DETAILED DESCRIPTION

One embodiment of the present invention is related to the maintenance of network elements and the troubleshooting of faults/failures within the network elements. The network elements may be found in Global-System-for-Mobile-Communications/3GPP (GSM/3GPP) networks. One embodiment is a method of capturing information relating to the faults/failures. One embodiment can capture information relating to faults/failures by collecting data from a busy/live network element. One embodiment collects the exact data that is communicated within a busy/live network element.

A busy/live network element can be engaged in the coordination of thousands of events and transactions in a single second. A network element can be a mobility management entity (MME), for example. In a live network, it is generally not possible to capture all of the data that is coordinated by the network.

As described above, maintaining a network element and performing troubleshooting of problems within the network element can be difficult because the amount of data that is coordinated by the network element can be too massive to be efficiently examined. One of the difficulties in trying to troubleshoot problems within a live network element is that the data coordinated by the live network element can be too large to be saved within logs. Attempting to save the data corresponding to the full external and internal traffic (coordinated by the network element) would generate gigabytes of data in only a few seconds. Further, high-performance analyzers would generally require hours to process the data (even if the analyzers have high-capacity servers and/or sophisticated hardware to process the data).

Another difficulty that arises when maintaining a network element and when performing troubleshooting of problems within the network element is that, when operator personnel attempt to analyze the network problems, the problems are often no longer visible.

Previous approaches attempted to track all of the data (of events and transactions) coordinated by a busy/live network element. The previous approaches also attempted to filter the data in accordance with the protocol used to communicate the data, or in accordance with the port used to communicate the data. The previous approaches also attempted to filter the data in accordance with the message content of the data. However, these previous approaches are neither efficient nor comprehensive when providing information for troubleshooting purposes.

In view of the above difficulties, one embodiment of the invention can provide a way to automatically capture information that is specifically related to failures/faults involving a live network element. Specifically, one embodiment can include an entity that automatically triggers a tracing of failures within a network. A failure can occur when a mobile subscriber's call cannot be made, for example.

Figure 1:
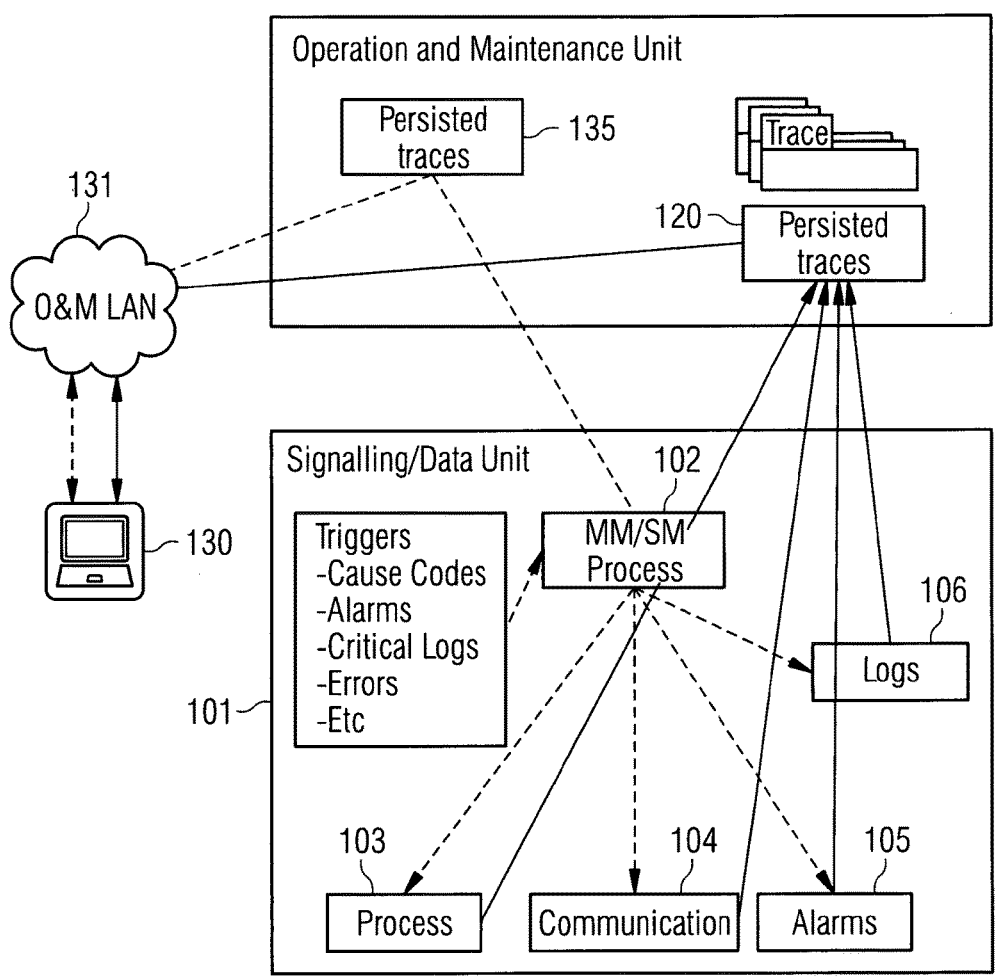
FIG. 1 illustrates a method of tracking faults in an Advanced Telecommunications Computing Architecture (ATCA) system in accordance with one embodiment.

FIG. 1 illustrates a method of tracking faults in an ATCA system in accordance with one embodiment. Whenever a failure occurs, an entity, such as a signaling/data unit 101, can automatically trigger the tracing of a failure by triggering a notifying event. The entity 101 can trigger the notifying event by using cause codes. A cause code is generally considered to be information transmitted between network elements that inform the network elements whether an activity was successfully performed. In one embodiment, each cause code can be associated with a corresponding threshold number of times that the cause code will appear before the notifying event is triggered. The entity 101 can also trigger the notifying event by setting off an alarm. The entity 101 can also trigger the notifying event by configuring a critical log.

Each notifying event can then trigger a specific function of storing information specifically relating to the failure. When the notifying event occurs, a mobility-management/session-management (MM/SM) process 102 can be coordinated to perform storing of information specifically relating to the failure such as, for example, process information 103, communication information 104, alarm information 105, and log information 106. The process information 103, communication information 104, alarm information 105, and log information 106 may be associated with a specific subscriber that experienced the failure, such as a failed call.

One embodiment can trace the subscriber's identity by tracing, for example, an International Mobile Subscriber Identity (IMSI), an International Mobile Station Equipment Identity (IMEI), a Mobile Station Integrated Services Digital Network (MSISDN), a MME Temporary Mobile Subscriber Identity (M-TMSI), a Globally Unique Temporary UE Identity (GUTI), a Mobile Management Entity (MME) Tunnel Endpoint Identifier (TEID), a Visitor Location Register (VLR) ID, a Stream Control Transmission Protocol (SCTP) stream ID, an evolved node B (eNB) Global ID, and so on.

In one embodiment, the traces that are automatically triggered are persisted to a unit that has a hard drive 120. The persisting allows the storing and the continuing of the trace after system restarts or unit restarts. The traced identities can be maintained by MM/SM process 102 that allocates the changing identities like globally unique temporary identifier (GUTI), MME-TEID or MME UE S1 Application Protocol (S1AP) ID. This allows for forwarding the changed identities to processes that collect, for example, logs, internal and external communication messages, or alarms.

As described above, because embodiments of the present invention store information that is specifically related to a failure, the amount of necessary information that is stored can be significantly reduced. Instead of storing all of the information coordinated by a network element, embodiments of the present invention can store information that is specifically related to a failure/fault or related to a subscriber that experienced the failure/fault.

When storing the information specifically relating to the failure, one embodiment stores the collected information into a unit that is able to persist the information over system restarts. One embodiment determines specific traced attributes, like logs, messages, or alarms, and forwards these traced attributes to the unit that can persist them over a system reboot. Persisting the information can comprise maintaining the integrity of the information over system restarts. For example, persisting information can comprise saving the information into a non-transitory memory so that the information is not lost in case of a system restart. The information can then later be collected and analyzed, for example, with an external tool 130 connected to an operation and maintenance LAN (O&M LAN) 131.

When persisting the information, one embodiment can automatically move the information to a system disk to later be analyzed. Because the information is stored on this system disk, one embodiment can generally ensure that the failure is visible to maintenance personnel.

The stored information can then be post-processed, and signaling sequences can then be combined with the logs that are, for example, aligned based on a time interval to ease and speed up the analysis of the failure/fault.

The stored information can also be used, for example, to automatically generate a test case on Research-and-Development (R&D) premises. One embodiment can collect external signaling data that can be converted to a test case that verifies the failure/fault case. This conversion can allow embodiments to more quickly and more easily solve and fix the failure/fault.

One embodiment allows a user to manually activate traces. These manually activated traces 135 can be activated by a user via external tool 130. The user can decide what types of events should be traced.

As described above, the triggered tracing of a failure will continue even though the identities associated with the corresponding network element are changed. As described above, after a failure/fault has been identified, a tracing framework stores the related logs, internal messages, external messages, alarms, and other attributes to a saving unit.

Figure 2:
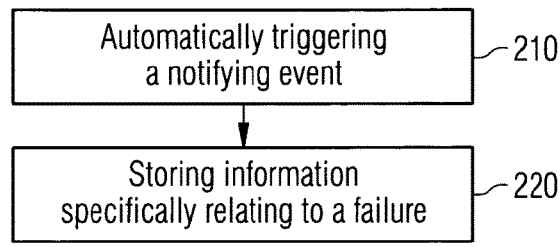
FIG. 2 illustrates a flowchart of a method in accordance with one embodiment.

FIG. 2 illustrates a flowchart of a method in accordance with an embodiment of the invention. The method illustrated in FIG. 2 includes, at 210, automatically triggering, by a signaling/data unit, a notifying event when a failure occurs. At 220, the method also includes storing information specifically relating to the failure. The storing is performed upon the automatic triggering of the notifying event. The specific information is stored such that the specific information persists after a system restart.

Figure 3:
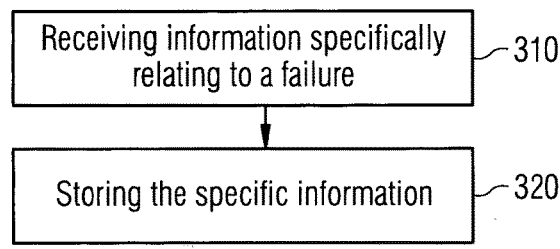
FIG. 3 illustrates a flowchart of a method in accordance with another embodiment.

FIG. 3 illustrates a flowchart of a method in accordance with another embodiment. The method illustrated in FIG. 3 includes, at 310, receiving, by an operation and maintenance unit, information specifically relating to a failure. The receiving is performed upon an automatic triggering of a notifying event. The automatic triggering of the notifying event occurs when the failure occurs. At 320, the method also stores the specific information such that the specific information persists after a system restart.

Figure 4:
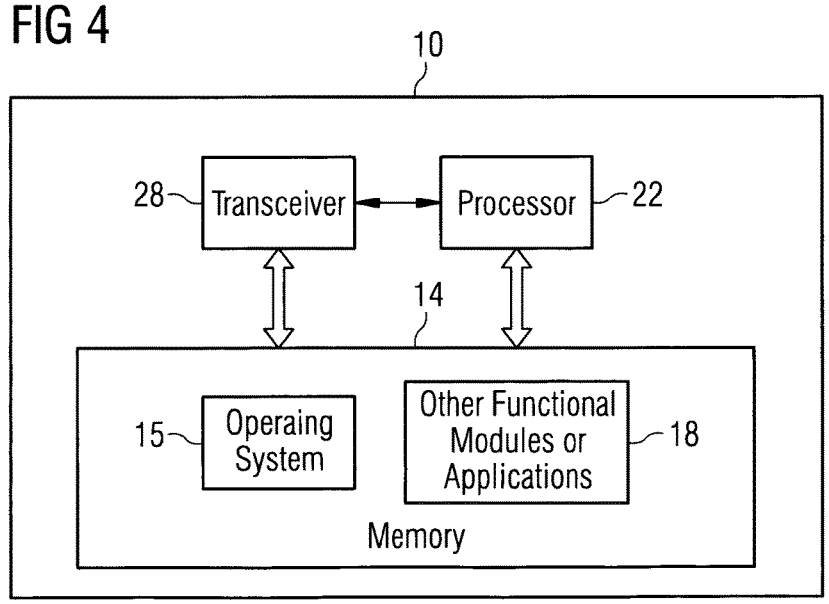
FIG. 4 illustrates an apparatus in accordance with one embodiment.

FIG. 4 illustrates an apparatus in accordance with an embodiment of the invention. Apparatus 10 can include a processor 22 for processing information and executing instructions or operations. Processor 22 can be any type of general or specific purpose processor. While a single processor 22 is shown in FIG. 4, multiple processors can be utilized according to other embodiments. Processor 22 can also include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 can further include a memory 14, coupled to processor 22, for storing information and instructions that can be executed by processor 22. Memory 14 can be one or more memories and of any type suitable to the local application environment, and can be implemented using any suitable volatile or nonvolatile data storage technology such as a semiconductor-based memory device, a magnetic memory device and system, an optical memory device and system, fixed memory, and removable memory. For example, memory 14 include any combination of random access memory (RAM), read only memory (ROM), static storage such as a magnetic or optical disk, or any other type of non-transitory machine or computer readable media. The instructions stored in memory 14 can include program instructions or computer program code that, when executed by processor 22, enable the apparatus 10 to perform tasks as described herein.

Apparatus 10 can also include one or more antennas (not shown) for transmitting and receiving signals and/or data to and from apparatus 10. Apparatus 10 can further include a transceiver 28 that modulates information on to a carrier waveform for transmission by the antenna(s) and demodulates information received via the antenna(s) for further processing by other elements of apparatus 10. In other embodiments, transceiver 28 can be capable of transmitting and receiving signals or data directly.

Processor 22 can perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 can store software modules that provide functionality when executed by processor 22. The modules can include an operating system 15 that provides operating system functionality for apparatus 10. The memory can also store one or more functional modules 18, such as an application or program, to provide additional functionality for apparatus 10. The components of apparatus 10 can be implemented in hardware, or as any suitable combination of hardware and software.

Figure 5:
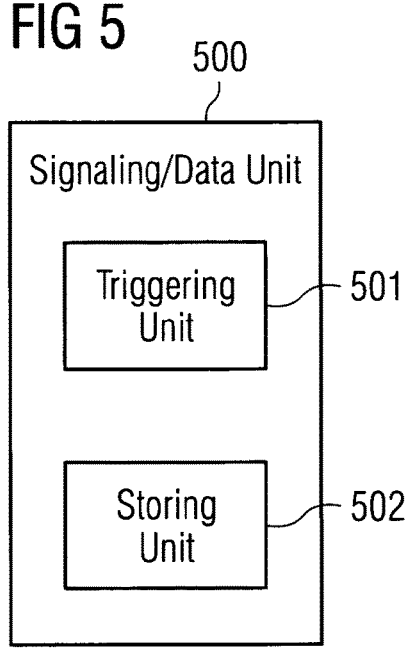
FIG. 5 illustrates an apparatus in accordance with another embodiment.

FIG. 5 illustrates an apparatus in accordance with another embodiment. Apparatus 500 can include a triggering unit 501 that automatically triggers a notifying event when a failure occurs. Apparatus 500 can also include a storing unit 502 that stores information specifically relating to the failure. The storing is performed upon the automatic triggering of the notifying event. The specific information is stored such that the specific information persists after a system restart.

Figure 6:
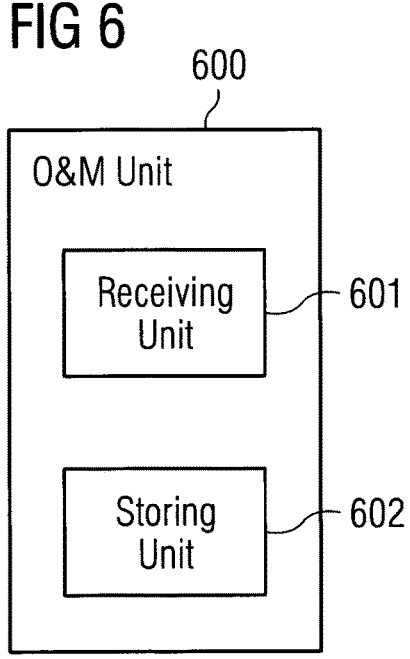
FIG. 6 illustrates an apparatus in accordance with yet another embodiment.

FIG. 6 illustrates an apparatus in accordance with yet another embodiment. Apparatus 600 can include a receiving unit 601 that receives information specifically relating to a failure. The receiving is performed upon an automatic triggering of a notifying event. The automatic triggering of the notifying event occurs when the failure occurs. Apparatus 600 can also include a storing unit 602 that stores the specific information such that the specific information persists after a system restart.

The described features, advantages, and characteristics of the invention can be combined in any suitable manner in one or more embodiments. One skilled in the relevant art will recognize that the invention can be practiced without one or more of the specific features or advantages of a particular embodiment. In other instances, additional features and advantages can be recognized in certain embodiments that may not be present in all embodiments of the invention. One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

I claim:

1. A non-transitory computer-readable medium encoding instructions that, when executed in hardware, perform a method, the method comprising:
   automatically triggering, by a signaling or data unit, a notifying event when a failure occurs, wherein the automatic triggering of the notifying event automatically triggers a tracing of the failure; and
   storing information associated with the trace and with a specific subscriber that experienced the failure, wherein the storing is performed after the automatic triggering of the notifying event, and the specific information is configured to allow the trace to continue after a telecommunications system restart.

2. The non-transitory computer-readable medium according to claim 1, wherein the failure comprises a failure within an advanced telecommunications computing architecture system or a cloud-based mobile network system.

3. The non-transitory computer-readable medium according to claim 1, wherein the failure comprises a failure within a mobility management entity.

4. The non-transitory computer-readable medium according to claim 1, wherein the automatically triggering of the notifying event when the failure occurs comprises triggering the notifying event using at least one of a cause code, a setting off of an alarm, and a configuring of a critical log.

5. The non-transitory computer-readable medium according to claim 1, wherein the storing information specifically relating to the trace comprises coordinating a mobility-management/session-management process to perform storing of the specific information relating to the trace, and the specific information relating to the trace comprises at least one of process information, communication information, alarm information, and log information.

6. The non-transitory computer-readable medium according to claim 1, wherein the specific information is associated with a specific subscriber that experienced the failure.

7. An apparatus, comprising:
   at least one processor; and
   at least one memory including computer program code, the at least one memory and the computer program code are configured, with the at least one processor, to cause the apparatus at least to:
   automatically trigger a notifying event when a failure occurs, wherein the triggering of the notifying event automatically triggers a tracing of the failure; and
   store information associated with the trace and with a specific subscriber that experienced the failure, wherein the storing is performed after the automatic triggering of the notifying event, and the specific information is configured to allow the trace to continue after a telecommunications system restart.

8. The apparatus according to claim 7, wherein the failure comprises a failure within an advanced telecommunications computing architecture system or a cloud-based mobile network system.

9. The apparatus according to claim 7, wherein the failure comprises a failure within a mobility management entity.

10. The apparatus according to claim 7, wherein the automatically triggering of the notifying event when the failure occurs comprises triggering the notifying event using at least one of a cause code, a setting off of an alarm, and a configuring of a critical log.

11. The apparatus according to claim 7, wherein the storing information specifically relating to the trace comprises coordinating a mobility-management or session-management process to perform storing of the specific information relating to the failure, and the specific information relating to the trace comprises at least one of process information, communication information, alarm information, and log information.

12. The apparatus according to claim 7, wherein the specific information is associated with a specific subscriber that experienced the failure.

13. An apparatus, comprising:
   at least one processor; and
   at least one memory including computer program code, the at least one memory and the computer program code are configured, with the at least one processor, to cause the apparatus at least to:
   receive at a network entity information associated with a trace and with a specific subscriber that experienced a failure associated with the trace, wherein the receiving occurs after an automatic triggering of a notifying event, and wherein the automatic triggering of the notifying event automatically triggers a tracing of the failure; and
   store, in a hard drive of the network entity, the specific information such that the specific information is configured to allow the trace to continue after a telecommunications system restart.

14. The apparatus according to claim 13, wherein the failure comprises a failure within an advanced telecommunications computing architecture system or a cloud-based mobile network system.

15. The apparatus according to claim 13, wherein the failure comprises a failure within a mobility management entity.

16. The apparatus according to claim 13, wherein the specific information is associated with a specific subscriber that experienced the failure.

17. The apparatus according to claim 13, the apparatus further caused to transmit the specific information to an external tool.

* * * * *